R. S. VAN ZANDT.
Step-Ladder.
No. 159,126.
Patented Jan. 26, 1875.
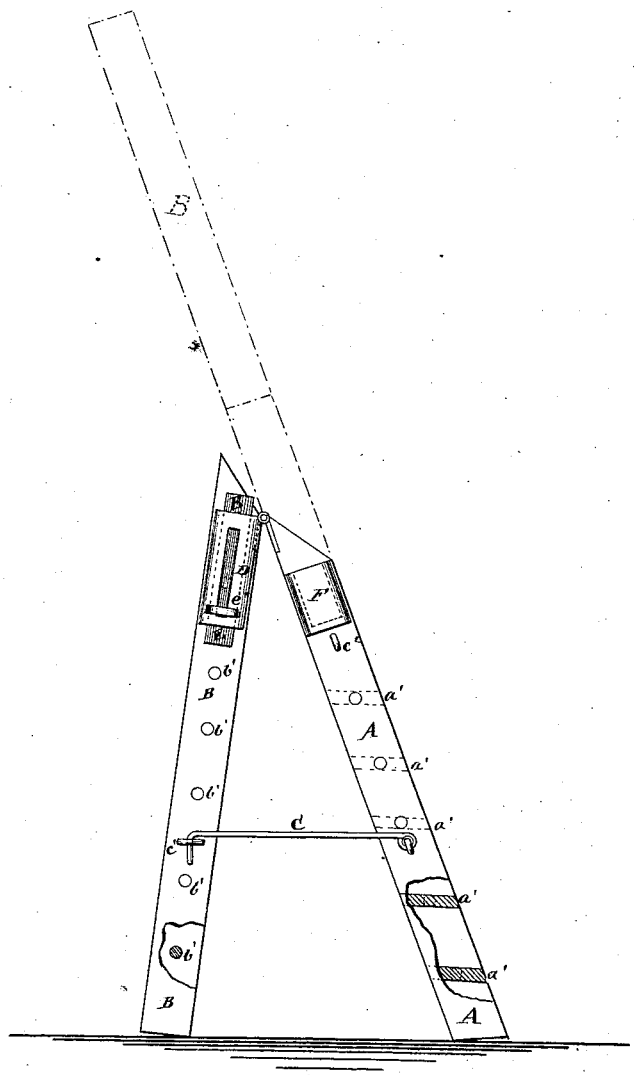
WITNESSES:
INVENTOR:
Robert S. Vanzandt
BY
ATTORNEYS.

UNITED STATES PATENT OFFICE.

ROBERT S. VAN ZANDT, OF WILLIAMSBURG, NEW YORK.

IMPROVEMENT IN STEP-LADDERS.

Specification forming part of Letters Patent No. 159,126, dated January 26, 1875; application filed December 12, 1874.

*To all whom it may concern:*

Be it known that I, ROBERT S. VAN ZANDT, of Williamsburg, Kings county, New York, have invented a new and useful Improvement in Combined Ladder and Step-Ladder, of which the following is a specification:

The figure is a side view of my improved device adjusted for use as a step-ladder, parts being broken away to show the construction, and showing in dotted lines the position of the upper part when adjusted for use as a ladder.

My invention has for its object to furnish an improved step-ladder which shall be so constructed that it may be conveniently opened out to serve as an ordinary ladder, which shall be strong and firm with either adjustment, may be folded together into a very compact form for storage and transportation, and shall be simple in construction and convenient in use.

The invention consists in the combination of the long slotted keepers, the sliding bolts, and the long keepers with the parts of the ladder, as hereinafter fully described.

A and B are the parts of the ladder, which are made of the same width, and the adjacent ends of the side bars of which are hinged to each other, as shown in the drawing, so that they may be turned into line with each other to form a ladder, turned at an angle with each other to form a step-ladder, and turned parallel with each other for storage and transportation. The part A is provided with steps $a'$, and the part B is provided with rounds $b'$. C are hooks, which are pivoted to the side bars of the part A, are hooked into eyes $c^1$ attached to the side bars of the part B when the device is adjusted for use as a step-ladder, to serve as braces to hold the parts A B in their proper relative positions, and are hooked into eyes $c^2$ attached to the upper parts of the side bars of the part A when the device is adjusted as a ladder, to keep said hooks out of the way. To the outer sides of the hinged ends of the side bars of the part B are attached long keepers D to receive the bolts E. The keepers D are slotted longitudinally to receive the shanks or stems of the knobs $e'$, by which the bolts E are operated, and which limit the play of said bolts. To the outer sides of the hinged ends of the side bars of the part A are attached long keepers F to receive the ends of the bolts E when the parts A B are adjusted in line with each other. The long keepers D F furnish long bearings for the bolts E, so that the parts A B may be firmly and strongly held in place when adjusted in line with each other. The bolts E should work so loosely in the keepers D that when the part B is raised into line with the part A the said bolts may drop by their own weight into the keepers F. The adjacent ends of the side bars of the parts A B may be made inclined, as shown in the figure, if desired.

Having thus described my invention, I claim as new and desire to secure by Letters Patent—

The combination of the long slotted keepers D, the sliding bolts E, and the long keepers F with the parts A B of the ladder, substantially as herein shown and described.

ROBERT S. VAN ZANDT.

Witnesses:
JAMES T. GRAHAM,
T. B. MOSHER.